Patented Dec. 3, 1935

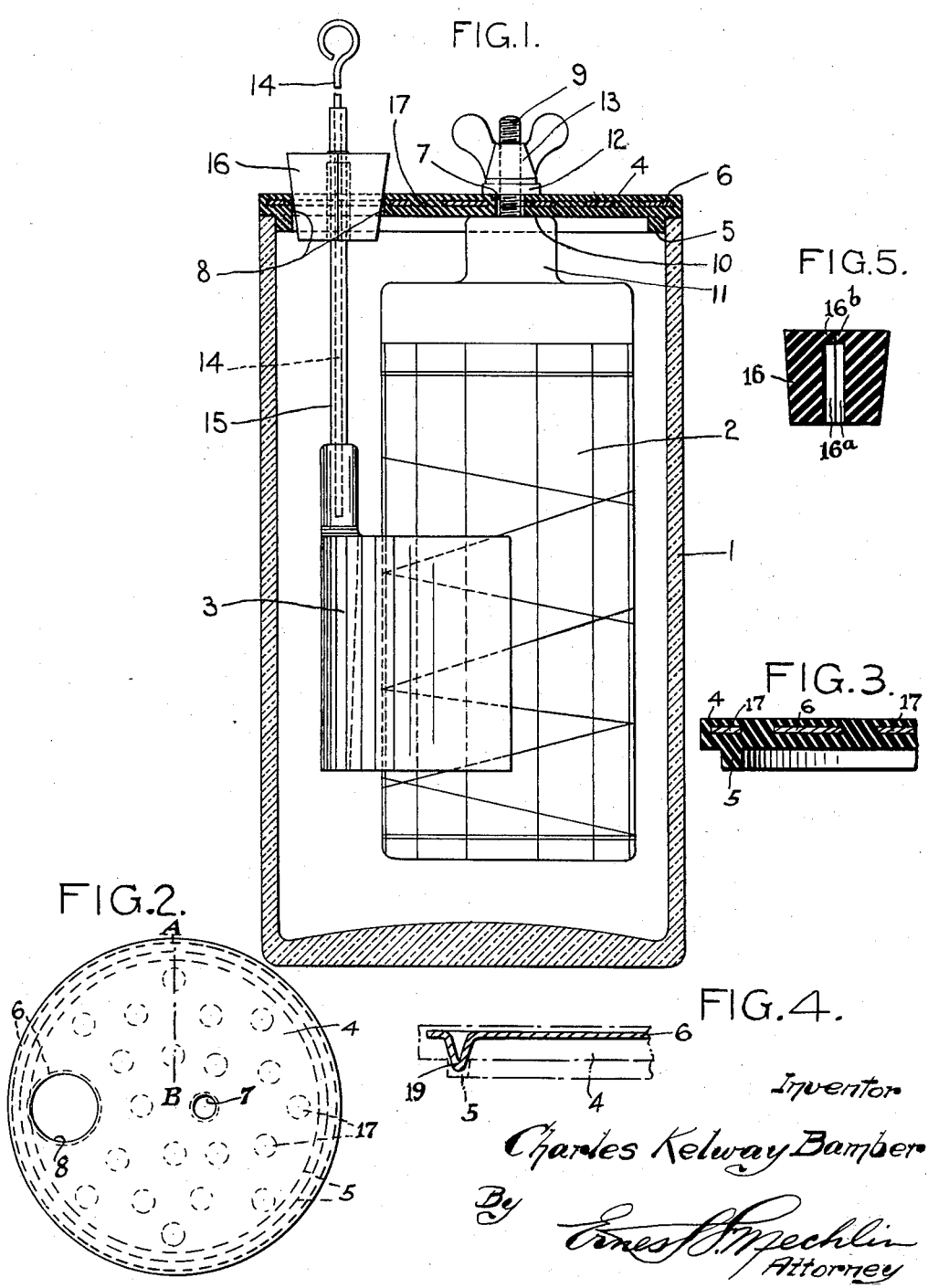

2,022,998

UNITED STATES PATENT OFFICE 2,022,998

BATTERY CELL

Charles Kelway Bamber, London, England, assignor to Bambairtite Battery Company, Limited, London, England, a British company Application December 23, 1933, Serial No. 703,771
In Great Britain December 23, 1932

2 Claims. (Cl. 136—169)

This invention relates to electric battery cells of Leclanché or like type comprising a zinc electrode and a porous pot or sack cell, these parts being arranged in a glass jar containing an exciting liquid or electrolyte.

With Leclanché batteries troubles are experienced due to the water content of the electrolyte evaporating. Also where the cells are arranged in series creeping of electrolyte from one cell to another takes place. With a view to avoiding these troubles various proposals have been made heretofore for closing the tops of Leclanché cells by means of removable lids.

It is essential in any Leclanché cell whose jar is equipped with a lid that the lid shall not be of a material which will be attacked either by the electrolyte or gases generated in the battery; or by insects. Further the lid must be such that it will not warp when exposed to heat.

It is also essential that the lid shall be of such material or of such a construction as to electrically insulate the terminals of the electrodes from one another and it is desirable that it shall not be fragile but shall be relatively strong and rigid, and such that it will enable an air-tight joint to be made between it and the jar, and also between it and the terminals of the electrodes.

It is an object of the present invention to provide an improved lid for a battery which, whilst being relatively cheap and highly efficient, will meet the several desirable conditions already mentioned, and avoid the disadvantages of the lids of previously proposed batteries.

It is another object of the invention to provide an improved battery in which a heavy sack cell and a relatively large and heavy zinc electrode may be suspended from the lid and thus both serve to hold the lid down on the jar. The suspension of both sack cell and zinc electrode avoids the possibility of one or other of these elements resting on the bottom of the jar and preventing the lid contacting at all points with the jar at the mouth thereof.

Where in a large battery a heavy sack cell and large zinc electrode are employed the lid must be strong and rigid to carry the weight without distortion of the lid, as if distortion occurs difficulty would be experienced in rendering the joint between the lid and the jar air tight. Further the lid must be such that should it be dropped when placing it in position in the jar, with the electrodes suspended from it, it will not break nor will contact of it with the jar break the latter. The lid according to this invention meets these requirements.

This invention is defined in the appended claims and described hereinafter with reference to the accompanying drawing, in which,—

Fig. 1 is a sectional elevation of a battery having a reinforced India rubber lid according to one embodiment of the invention.

Fig. 2 is a plan of the lid shown in Fig. 1 removed from the jar of the battery and with the electrodes removed, this figure also showing a constructional detail hereinafter described.

Fig. 3 is a fragmentary sectional view of the lid shown in Fig. 2, the section being taken on the line A—B of that figure.

Fig. 4 is a fragmentary view in sectional elevation illustrating another embodiment of the invention, and Fig. 5 is a vertical section of the split rubber plug shown in Fig. 1 and through which the terminal wire of the zinc electrode extends.

Referring to the drawing, 1 is the glass jar of the Leclanché battery shown in the drawing; 2 being the carbon electrode or sack and 3 the zinc electrode, 4 is an India rubber lid which has a depending portion or flange 5 which enters the mouth of the jar 1 and positions the lid in relation to the jar, the marginal region of the lid resting upon the annular upper surface of the jar 1. The lid 4 is reinforced by a steel or other appropriate metal or alloy plate 6 of a thickness sufficient to give the required rigidity, and provided on one of its diameters with two apertures 7 and 8, the aperture 7 being arranged eccentrically of the lid and being the aperture through which the terminal or binding post 9 of the sack 2 extends, and the aperture 8 being disposed near the edge of the lid and being the aperture through which the terminal wire of the zinc electrode extends. The upper surface 10 of the head 11 of the sack abuts and is held against the under surface of the lid 4, 12 being an abutment or nut screwed on the terminal 9 and serving, by resting on the upper surface of the lid, to suspend the sack in the jar. The nut or abutment 12 is screwed down so as to clamp the surface 10 of the head 11 against the lid and make an airtight joint between these parts. 13 is a winged or butterfly nut provided on the terminal 9 for use in connecting a circuit wire to the cell. The zinc electrode 3 is of semi-circular or horse-shoe form in plan and partially embraces the sack 2, but a stick or other shaped zinc might be employed if desired. The zinc electrode 3 has a terminal wire 14 extending upwardly from it, which wire, in the construction shown, is covered with an insulating tube 15 which conveniently is formed of India rubber. The terminal wire 14 extends through a split rubber plug 16 which closes the aperture 8 in the lid 4. A recess 16ª is formed in each half of the plug, these recesses, when the half plugs are placed together, forming a passage extending almost completely through the plug, the passage being open at the bottom and closed at the top by two relatively thin tongues 16ᵇ. The terminal wire 14 extending through the plug, or its cover if employed, is tightly gripped by the tongues 16b and a secure hold is obtained in addition to an effective air-tight joint. A slight clearance obtains between the walls of the recesses 16a and the wire. Tongues, similar to the tongues 16b, may be provided at the lower end of the passage 16. The plate 6 is of a size greater than the mouth of the jar 1 of the battery and is entirely enclosed in India rubber which is of an appropriate degree of hardness when vulcanized. The apertures in the plate corresponding to the apertures 7 and 8 mentioned above are of a size sufficiently greater than that needed to accommodate the terminal post 9 and the split plug 16 as to enable the holes in the plate to be lined with India rubber so that no portion of the metal plate is exposed at the holes through the lid.

In order that the sheet-like portions of rubber on opposite sides of the plate 6 may be effectively locked to the plate and to one another, the plate has holes 17 through it of a size and number such as not materially to affect its rigidity. The provision of holes such as 17 in the plate, in addition to the holes for the terminals of the electrodes, ensures that the rubber on both sides of the plate is united by the rubber which extends through such holes as well as by the rubber around the peripheral edge of the plate.

In the embodiment of the invention illustrated in Figs. 1 and 2 a depending flange 5 is provided for the purpose of positioning the lid on the jar. This flange 5 may be reinforced by pressing downwardly from the reinforcing plate 6 an annular corrugation of a depth sufficient to extend down into the flange portion 5. Where it is desired that the zinc electrode shall lie as near as possible to the wall of the jar, the depending flange 5 would be omitted in the region of the aperture 8, and this aperture be provided in such a position that the lower end of the rubber plug 16 would enter the mouth of the jar close to the inner periphery of the wall of the jar.

In most cases these jars have a circular mouth, but a lid according to the present invention may equally well be employed with a jar having a square or other shape of mouth.

A battery lid according to this invention is such that, without the employment of a gasket it will make an effective air-tight joint or seal with the upper edge or surface of the jar and also is such that no packing ring or gasket is necessary to make an air-tight joint between the lid and the terminal of the sack cell.

If desired the lid may be such that a greater thickness of rubber obtains on the lower side of the reinforcing plate than obtains on its upper side. Further, if desired, the marginal region of the under side of the lid which seats on the edge of the jar may be formed of rubber which is somewhat softer than the rubber employed for the remainder of the lid.

It will be understood that in the process of preparing the India rubber employed in the improved battery lid according to the invention fillers or other ingredients which are compounded with the raw rubber before it is vulcanized will be such that they will not be attacked by gas or fumes from the electrolyte in the cell.

In a battery according to this invention both electrodes are suspended from the lid as already indicated, and the weight of the electrodes suspended from the lid is the principal factor in holding the lid down on to the jar so that the India rubber of the marginal region of the lid forms an air-tight joint with the upper edge or mouth of the jar.

Where the jar is circular the invention contemplates disposing the sack cell eccentrically of the lid and employing a zinc electrode of semi-circular or horseshoe shape in plan. Such a large zinc would be relatively heavy, but it is found that no difficulty is experienced in suspending a heavy zinc by the split rubber plug 16 provided with gripping tongues such as 16b. The tongues 16b ensure a secure hold on the terminal wire 14 and an effective air-tight joint between the plug and such wire.

The reinforcing plate 6 might be slightly domed, and other variations might be made in constructional details without departing from the invention.

What I claim is:—

1. A battery jar closure, comprising a lid formed of a rigid metal plate of a size greater than the mouth of the jar and enclosed in India rubber, an aperture through the central region of said lid to accommodate the terminal of the carbon electrode to be suspended from the lid, another and larger aperture through the lid adjacent the marginal region of the plate, the apertures through the plate having their walls lined with India rubber, a tapered and split rubber plug closing said larger aperture, co-operating recesses in the halves of the said plug forming a passage through the greater part of the length of the plug to accommodate with clearance the terminal wire of the zinc electrode, thin rubber tongue portions at an end of the passage to close the latter and by gripping the said wire to support the zinc electrode, and depending means integral with the rubber of the lid adapted to enter the mouth of the jar and position the lid on the jar.

2. In a battery, the combination of a glass jar to contain electrolyte, a plane annular surface at the top of said jar, a lid formed of a rigid metal plate of a size greater than the mouth of said jar and enclosed in India rubber, a carbon electrode having a terminal post, an aperture through the central region of said lid through which said terminal post extends, means on said terminal post bearing on said lid to suspend said electrode, another and larger aperture through the lid adjacent the marginal region of the plate, the apertures through the plate having their walls lined with India rubber, a zinc electrode having a terminal wire, a tapered and split rubber plug closing said larger aperture, co-operating recesses in the halves of the said plug forming a passage through the greater part of the length of the plug, said terminal wire extending with clearance through said passage, thin rubber tongue portions at an end of the passage closing the latter and gripping the said wire, thereby suspending the zinc electrode, depending means integral with the rubber of the lid adapted to enter the mouth of the jar and position the lid on the jar, and a plurality of holes through the metal plate filled with rubber integral with the rubber at either side of the plate and not affecting materially the rigidity of the plate, the marginal portion of the lid being held only by the weight of the parts in air-tight contact with said annular surface.

CHARLES KELWAY BAMBER.